UNITED STATES PATENT OFFICE.

JOHN JEFFERSON GRAY, JR., OF ROCKDALE, TENNESSEE.

PROCESS OF MAKING FERROPHOSPHORUS FROM IRON PHOSPHATIC MATERIAL.

1,265,076.  Specification of Letters Patent.  Patented May 7, 1918.

No Drawing.  Application filed August 2, 1916. Serial No. 112,865.

*To all whom it may concern:*

Be it known that I, JOHN JEFFERSON GRAY, Jr., a citizen of the United States, residing at Rockdale, in the county of Maury and State of Tennessee, have invented certain new and useful Improvements in Processes of Making Ferrophosphorus from Iron Phosphatic Material, and I do hereby declare the following to be a full, clear, and exact description of the invention, such as will enable others skilled in the art to which it appertains to make and use the same.

This invention relates to a process of making ferro-phosphorus from the so-called iron phosphates or phosphatic material in general that contains iron and phosphorus in a state of chemical combination. Instances of such material suitable for this process are found in the ores known as "vivianite", "Alta Vela" phosphates and "Redonda" phosphates, as well as certain raw materials that are produced artificially.

It has been heretofore proposed to make ferrophosphorus from phosphatic material such as tri-calcium phosphate, in which the iron and phosphorus are not chemically united, by liberating the phosphorus and iron from the rock, and then causing them to combine; but this invention differs from said prior procedure in that the phosphorus and iron being already chemically combined in the raw material, it is only necessary to free the ferro-phosphorus from the other constituents by a reducing or other action.

The present process is a continuous one, and is preferably carried out in a blast furnace. It may be said to consist in charging into a furnace a suitable mixture of carbon, phosphatic material containing combined iron and phosphorus, and a fluxing material, in suitable proportions, to effect the reduction of the raw material to ferrophosphorus, and the slagging off of the impurities. Of course, an acid or a basic flux is employed according to the chemical character of the impurities; and it is preferred to employ preheated air, in regulated quantities in order to produce an intense localized temperature in the fusion zone, without oxidizing more carbon in said zone than is necessary to provide the desired degree of heat, and also in order to produce a deoxidizing atmosphere in the furnace.

A suitable raw phosphatic material for this process may be produced by the action of crude waste phosphoric acid, $H_3PO_4$ on iron ore containing for example $Fe_2O_3$, silica, and other impurities. This reaction produces a raw material consisting largely of iron phosphate $Fe_2(PO_4)_2$, mixed with silica and other impurities. Somewhat similar iron phosphate combinations are found in the naturally occurring phosphate ores above mentioned.

In order that the process may be the more clearly understood a charge may be made up as follows:—

|  | Lbs. | Lbs. |
|---|---|---|
| Phosphatic material |  | 14700 |
| Containing $Fe_2(PO_4)_2$ | 12110 |  |
| Containing silica $SiO_2$ | 2590 |  |
| Lime stone |  | 4300 |
| Containing CaO | 2410 |  |
| Coke |  | 9000 |
| Air |  | 48396 |

When this charge is smelted the added limestone fluxes the silica carried by the iron phosphate and the carbon deoxidizes the latter, changing it into iron phosphid, or ferrophosphorus.

The preheated air is so regulated as to not waste the carbon, after the required reducing temperature is attained, and the free carbon present as well as the reducing atmosphere maintained in the furnace readily brings about the desired reactions.

It will be observed that the reactions of this process are entirely different from the reactions involved in those processes wherein tri-calcium phosphate is employed, in that among other things in this process the silica present does not liberate $P_2O_5$ and the free carbon present is not relied on to reduce $P_2O_5$ to elemental phosphorus as is the case in the prior processes.

It will be further observed that the amount of carbon necessary to furnace ores or other phosphatic material of the class described for the production of high grade ferro-phosphorus is greatly in excess of that required for the smelting of the ordinary and well known high phosphorus ores for the production of high phosphorus pig iron. In some cases, this excess of carbon may reach as much as 40% or higher.

The reason for this is as follows:—In an ordinary blast furnace process of smelting the above high phosphorus ores, for high phosphorus pig iron, it is, of course, very desirable to save carbon and therefore only a certain and well known proportion of carbon is admitted to the furnace in such cases. This carbon becomes incandescent in the reducing zone of the furnace and it reduces some of the iron ore to an iron phosphid, containing say from 1% to 4% of phosphorus.

The remainder of the ore is converted into pig iron, and any additional amount of carbon that might be used would be wasted in such a process.

In like manner should it be attempted to convert the above mentioned raw material or iron phosphatic ores into high phosphorus pig iron, a similar definite, relatively, smaller proportion of carbon would be employed; and any amount of carbon in excess of this said definite proportion would commercially defeat the purpose, or cause a failure to produce profitably the desired high phosphorus pig iron.

On the other hand, I have discovered that by increasing the amount of carbon above that necessary, in any case, to produce high phosphorus pig iron, and to the extent, as is indicated in this specification, or by proportioning the charge as stated above, I am enabled to reduce substantially all of the iron-phosphate present in the charge to the phosphid, and at the same time, produce a ferro-phosphorus that contains as high as 22% of phosphorus a result never heretofore attained in a blast furnace, so far as I am aware.

It is obvious that those skilled in the art may vary the details of the process without departing from the spirit of the invention, and therefore I do not wish to be limited to the above disclosure except as may be required by the claims.

What I claim is:—

1. The process of making in a blast furnace ferro-phosphorus containing definite, uniform, proportions of more than 15% phosphorus from raw material consisting mainly of a phosphate of iron mixed with impurities which consists in preparing a suitable charge of solid carbon and said raw material, said carbon being in excess of that required to convert said material into high phosphorus pig iron; adding to said charge a suitable fluxing material for said impurities; and raising the temperature sufficient to reduce said iron phosphate to an iron phosphid and to flux off said impurities, substantially as described.

2. The process of making in a blast furnace ferro-phosphorus containing definite, uniform, proportions of more than 15% phosphorus from raw material consisting mainly of a phosphate of iron mixed with other impurities containing silica, which consists in preparing a suitable mixture of a suitable quantity of carbon and said raw material, said carbon being in the solid state and in excess; adding to said mixture fluxing material containing basic compounds suitable for slagging off said silica and impurities; raising the temperature of the furnace sufficient to reduce said iron phosphate to an iron phosphid; and maintaining a reducing atmosphere in the furnace, substantially as described.

3. The process of making in a blast furnace ferro-phosphorus containing definite, uniform, proportions of more than 15% phosphorus from natural phosphate ores containing oxygen, phosphorus and iron in chemical combination, which consists in preparing a suitable charge of a suitable quantity of carbon, phosphate ore, and fluxing material, said carbon being in the solid state and in excess, raising the temperature sufficiently to eliminate the oxygen only from said combined iron and phosphorus and to slag off the other materials of said ores; and maintaining a reducing atmosphere in the furnace, substantially as described.

In testimony whereof I affix my signature in presence of two witnesses.

JOHN JEFFERSON GRAY, Jr.

Witnesses:
 J. H. BASKINS,
 FLETCHER KEEN.